(12) United States Patent
Baldwin et al.

(10) Patent No.: US 12,376,603 B2
(45) Date of Patent: Aug. 5, 2025

(54) APPARATUS FOR DEPOSITING

(71) Applicant: SOCIETE DES PRODUITS NESTLE S.A., Vevey (CH)

(72) Inventors: Adam Lee Baldwin, York (GB); Richard John Leadbeater, York (GB); Jonathan Sutton, York (GB)

(73) Assignee: Societe des Produits Nestle S.A., Vevey (CH)

( * ) Notice: Subject to any disclaimer, the term of this patent is extended or adjusted under 35 U.S.C. 154(b) by 496 days.

(21) Appl. No.: 17/755,729

(22) PCT Filed: Nov. 5, 2020

(86) PCT No.: PCT/EP2020/081071
§ 371 (c)(1),
(2) Date: May 6, 2022

(87) PCT Pub. No.: WO2021/089675
PCT Pub. Date: May 14, 2021

(65) Prior Publication Data
US 2022/0386642 A1    Dec. 8, 2022

(30) Foreign Application Priority Data

Nov. 8, 2019 (EP) .................................... 19208078

(51) Int. Cl.
*A23G 1/20* (2006.01)
(52) U.S. Cl.
CPC ............. *A23G 1/206* (2013.01); *A23G 1/208* (2013.01)

(58) Field of Classification Search
CPC ..................................................... A23G 1/206
See application file for complete search history.

(56) References Cited

U.S. PATENT DOCUMENTS

| 6,302,296 B1 | 10/2001 | Nelson et al. |
| 2004/0109914 A1 | 6/2004 | Tabassi |
| 2012/0160160 A1* | 6/2012 | Walker .................. A23G 3/203 141/311 A |
| 2013/0255828 A1 | 10/2013 | Mengibar Rivas |

FOREIGN PATENT DOCUMENTS

| CA | 2484726 A1 | 4/2005 |
| CN | 203380027 U | 1/2014 |
| EP | 2345331 A1 | 7/2011 |

(Continued)

OTHER PUBLICATIONS

Russian Office Action for Appl No. 2022114597/10 dated Mar. 26, 2024, 12 pages.

(Continued)

*Primary Examiner* — Virak Nguon
(74) *Attorney, Agent, or Firm* — K&L Gates LLP

(57) ABSTRACT

An apparatus for depositing a food product comprising a nozzle having a pressurised chamber and a food product outlet; a valve needle movable relative between a closed position and to one of a plurality of discrete open positions; and an actuator configured to set the position of the valve needle relative to the outlet, wherein the nozzle is further able to rotate in use to change the direction of flow of a food product being deposited by the apparatus.

15 Claims, 11 Drawing Sheets

(56) References Cited

FOREIGN PATENT DOCUMENTS

| GB | 211479 | | 11/1924 | | |
|----|--------|---|---------|---|---|
| GB | 211479 | A * | 11/1924 | | |
| GB | 921456 | A | 3/1963 | | |
| GB | 978979 | A | 1/1965 | | |
| GB | 1185378 | | 3/1970 | | |
| GB | 1185378 | A * | 3/1970 | ............ | A23G 1/206 |
| GB | 2169843 | | 7/1986 | | |
| JP | S61187751 | A | 8/1986 | | |
| JP | 2008045191 | A | 2/2008 | | |
| KR | 200348632 | Y1 | 4/2004 | | |
| RU | 2259309 | C2 | 8/2005 | | |
| RU | 2646236 | C2 | 3/2018 | | |
| WO | 0043699 | | 7/2000 | | |
| WO | 2010063542 | | 6/2010 | | |
| WO | 2015036878 | A1 | 3/2015 | | |
| WO | 2018091236 | A1 | 5/2018 | | |

OTHER PUBLICATIONS

Chinese Office Action for Appl No. 202080072574.3 dated Jul. 22, 2023.

Chile Office Action for Appl No. 2022-000887 dated Jun. 15, 2023.

Japanese Office Action for Appl No. 2022-524249 dated Apr. 15, 2025, 3 pages.

* cited by examiner

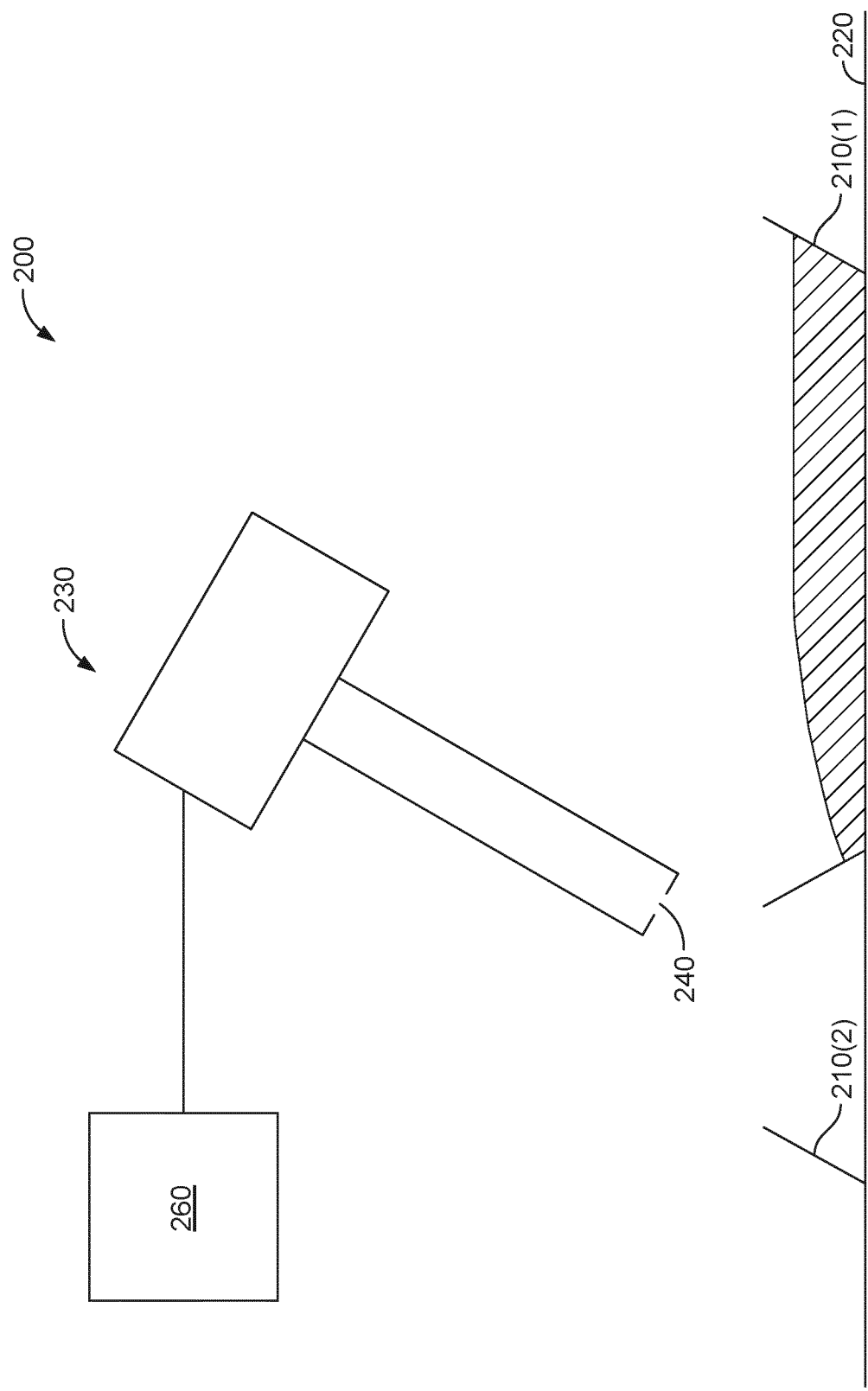

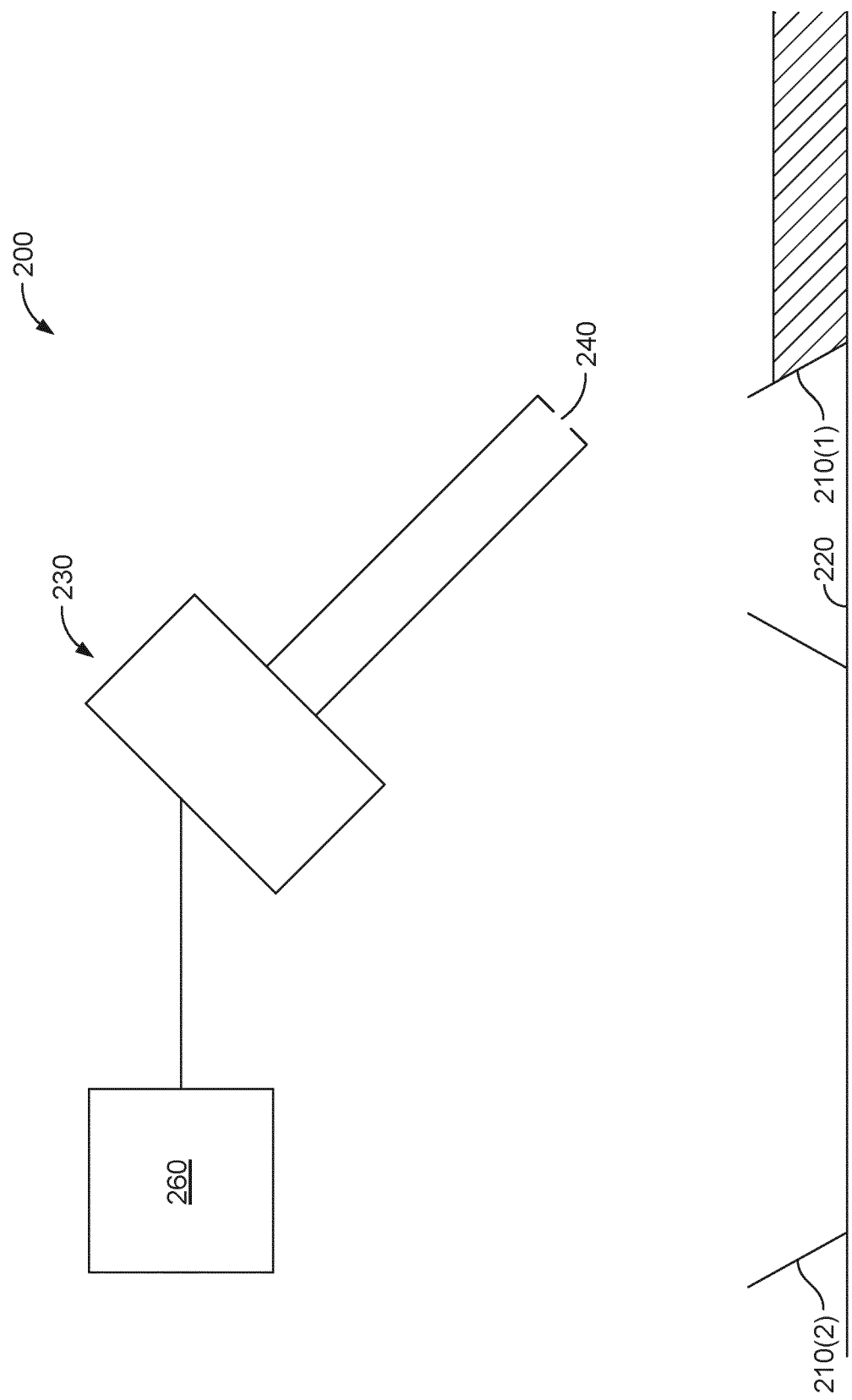

APPARATUS FOR DEPOSITING

CROSS REFERENCE TO RELATED APPLICATIONS

The present application is a National Stage of International Application No. PCT/EP2020/081071, filed on Nov. 5, 2020. which claims priority to European Patent Application No. 19208078.6, filed on Nov. 8, 2019, the entire contents of which are being incorporated herein by reference.

FIELD OF THE INVENTION

The invention relates to an apparatus for depositing a food product. More, particularly, but not exclusively, the invention relates to such an apparatus for use in filling mould cavities for confectionery products.

BACKGROUND

Confectionery products are commonly produced by depositing food products into a mould. The food products which can be deposited using such methods include chocolate (such as aerated chocolate including macro or micro bubbles), caramel, mousse, and many others.

One existing technique for depositing a food product into a mould uses a piston-type depositor. A piston-type depositor is provided with a chamber to which the food product is supplied and subjected to a series of pistons. As the series of pistons retract, a given volume of food product is drawn into each respective piston chamber and stored whilst it is provided with an outlet orifice. A piston is moved through the piston chamber to force the food product through the outlet orifice.

An alternative technique for depositing the food product into a mould uses a jet depositor. A jet depositor comprises a chamber which receives the food product under pressure (typically 1-15 bar), and the chamber is provided with an outlet orifice through which the food product is deposited. A needle valve is provided which seals the orifice and can be moved to release the food product.

Moulds will generally be provided along a moving track to allow many moulds to be filled in quick succession and depositors will often move in synchronisation with the moulds in a linear motion to allow the deposition time to be elongated.

The present inventors have identified an improved apparatus for depositing a food product, which provides numerous benefits. The apparatus of the present invention allows greater control over the deposition of the food product, including greater control of the amount of the food product which is deposited per mould, the distribution of the food product in each mould, as well as minimising the quantity of food product which is wasted.

The apparatus of the present invention further provides space-saving benefits, which reduce the footprint within a factory, thereby providing cost-saving benefits. The apparatus additionally allows a greater number of moulds per minute to be filled relative to comparable jet depositor systems.

SUMMARY OF THE INVENTION

Aspects of the invention are set out in the accompanying claims.

According to a first aspect of the invention there is provided: an apparatus for depositing a food product, the apparatus comprising: a nozzle having a chamber for receiving a food product under a positive pressure, the chamber being provided with a food product outlet being provided with a first sealing surface; and a valve needle comprising a second sealing surface and being movable relative to the outlet between a closed position in which the first sealing surface is proximate to the second sealing surface, and to one of a plurality of discrete open positions relative to the outlet.

The apparatus further comprises an actuator configured to set the position of the valve needle relative to the outlet, the actuator operable to set the position of the needle to the closed position and any one of the plurality of open positions for depositing the food product, and wherein the nozzle is further configured to rotate in use to change the direction of flow of a food product being deposited by the apparatus.

Accordingly, there is provided an apparatus, which allows for fine control of the deposition of the food product, including the quantity of the food product deposited, the timing of the deposition, and the location of the deposition within a mould cavity.

Furthermore, the apparatus of the first aspect of the invention provides space saving benefits as the nozzle is not required to move laterally in order to continuously deposit the food product within a moving mould cavity, due to the rotation of the nozzle in use. Accordingly, components necessary to allow such a linear motion are not essential to the apparatus.

The fine deposition control afforded by the nozzle further facilitates the implementation of the nozzle rotation mechanism as the food product can be deposited evenly across a mould cavity using the rotational motion, as the height of the valve needle is adjusted. That is, the combined valve needle control of the invention provides the required level of precise control of the deposition of the food product to eliminate the need for synchronised linear motion.

Furthermore, the high level of deposition control prevents wastage of the food product due to overflow as the rate of flow can, for example, be gradually reduced to provide precise closing times. Additionally, the invention allows the food product to be deposited accurately across a mould cavity, which reduces the level of mould vibration required post-deposition to achieve a smooth coverage of the food product within the mould cavity.

The first sealing surface is defined as being proximate to the second sealing surface in a closed position, however the precise distance between the two may vary, for example depending on the viscosity of the food product. As an example, for a non-viscous food product, the first sealing surface may abut the second sealing surface in the closed position, however for a highly viscous food product, the first sealing surface and the second sealing surface may not necessarily abut in the closed position. However, this dependency of the closed position on food product viscosity is not required and preferably the needle is fully closed against the nozzle regardless of mass viscosity.

Advantageously, the apparatus may further comprise a mould cavity transporter configured in use to move one or more mould cavities relative to the rotating nozzle for depositing the food product into the one or more mould cavities. For example, the mould cavity transporter may be a conveyor belt or a chain system, or any other means capable of moving mould cavities relative to the depositor.

Accordingly, one or more mould cavities may be moved under the nozzle. As such, it is not essential for the nozzle to move laterally in synchronisation with a mould cavity in order to continuously deposit the food product into a mould cavity. Therefore, mechanical stress and inertia in the apparatus may be significantly reduced relative to systems which utilise linear motion of the depositor.

In some aspects, the apparatus may further comprise a controller, the controller configured to: control the actuator to set the position of the valve needle; and control the rotation of the nozzle in use. Such a system allows for fine control of the deposition of the food product as the controller may adjust the flow rate (by adjusting the position of the valve needle) dependent on the (rotational) position of the nozzle, and vice versa.

Furthermore, the controller may be configured to control the actuator to set the position of the valve needle to at least two different open positions during deposition of the food product. Accordingly, the rate of deposition of the food product can be altered during deposition into a single mould cavity. This allows accurate control of the quantity and distribution of the food product within a mould cavity.

In some aspects, the controller may be configured to cause the actuator to alter the position of the valve needle to an open position at a first angular position of the nozzle to begin deposition of the food product, and the controller may be configured to cause the actuator to alter the position of the valve needle to the closed position at a second angular position different from the first angular position.

Such an arrangement allows the food product to be deposited into a given mould cavity without reducing the number of moulds that can be filled per minute. Accordingly, the rate of flow of the food product during deposition can be reduced, allowing more precise control of the amount of food product deposited.

Furthermore, the controller may be configured to cause the nozzle to rotate from the second angular position to the first angular position after the valve needle has closed. Accordingly, a single nozzle may deposit the food product into multiple consecutive mould cavities, allowing a large number of mould cavities to be filled per minute.

Additionally, an angular velocity of the nozzle during the rotation from the second angular position to the first angular position may be larger in magnitude than an angular velocity of the nozzle during deposition of the food product.

Such an arrangement prevents 'tailing' of the food product, where after the nozzle has been closed a small amount of the food product falls from the nozzle and lands in a space between mould cavities. This aspect allows the 'tail' to be deposited inside the same mould cavity, thereby reducing wastage of the food product. As an example, the nozzle may move at up to approximately 800 mm/s during the rotation from the second angular position back to the first angular position.

In some aspects, the controller may be configured to cause the actuator to control the position of the valve needle within the nozzle and to simultaneously control the angular position of the nozzle to cause the nozzle to deposit food product over multiple portions of the mould cavity.

Accordingly, the apparatus provides precise control over the location of deposition within the mould cavity, allowing the food product to be deposited into different regions (for example the corners) of a mould cavity with a high degree of accuracy. Furthermore, the location of deposition within the mould cavity can be altered during deposition to provide an even distribution of the food product within the mould cavity.

Advantageously, the rotation of the nozzle may be synchronised in use with the movement of one or more mould cavities. As such, the accuracy of the deposition into a given mould cavity can be improved. For example, the rotation of the nozzle may be generally synchronised to the movement of the mould cavities such that small adjustments to the timing of the rotation can be made, as well as adjustments to the position of the valve needle, allowing the apparatus to compensate for small misalignments between mould cavities.

In some aspects, the valve needle may have a substantially conical shape and the outlet may have a substantially cylindrical shape, and wherein in an open position the valve needle may define an annular orifice between the outer surface of the valve needle and the inner surface of the substantially cylindrical outlet, and wherein the position of the valve needle may determine the size of the annular orifice.

Therefore, the apparatus provides for fine control of the orifice size, where moving the nozzle in a particular direction increases the orifice size to increase the flow rate, and moving the nozzle in the opposite direction reduces the orifice size to decrease the flow rate.

Advantageously, the sides of the valve needle may be angled with respect to walls of the substantially cylindrical outlet, preferably wherein the angle between the sides of the valve needle and the walls of the substantially cylindrical outlet is between 1 and 45 degrees, more preferably wherein the angle between the sides of the valve needle and the walls of the substantially cylindrical outlet is between 10 and 30 degrees, and further preferably wherein the angle between the sides of the valve needle and the walls of the substantially cylindrical outlet is 20 degrees. As such, the flow rate of the food product can be precisely controlled during deposition. The above angles provide small changes in flow rate for a given movement of the valve needle, thereby allowing the flow rate to be precisely controlled.

In some aspects, the apparatus may comprise a plurality of nozzles, wherein the valve needle position and the rotational position are independently controllable for each nozzle. Accordingly, multiple nozzles can be used to, for example, deposit the food product into a single mould, allowing large moulds to be evenly and precisely filled. This allows large moulds to be evenly filled with the food product without a large amount of mould vibration being required post-deposition to achieve a smooth coverage of the food product within each mould cavity.

Furthermore, the independent control of each nozzle allows misalignments in moulds (or a different target product) to be accounted for and therefore for moulds to be filled consistently. Furthermore, this allows for the compensation of any pressure/flow variation along the depositor chamber in order to optimise the process/weight control of the final product.

In such aspects, a plurality of nozzles may be arranged in a plurality of groups of nozzles, where each group of nozzles may comprise one or more nozzles, and each group of nozzles may be configured to deposit the food product into a separate mould cavity. Accordingly, the apparatus may deposit the food product into multiple moulds simultaneously, greatly increasing the number of moulds that can be filled per minute.

Advantageously, the apparatus may further comprise a plurality of rows of nozzles, wherein the actuator may be configured to cause each row of nozzles to alternatively deposit the food product into different mould cavities. This may take the form of multiple depositors arranged in series, or a single depositor may comprise multiple rows of nozzles in series.

That is, mould cavities may be consecutively moved through the apparatus and each nozzle only deposits the food product into every other mould cavity. In other words, a first nozzle will deposit the food product into a given mould cavity, but will not deposit the food product into the next mould cavity, which passes under the nozzle. The first nozzle will then deposit the food product into the following mould cavity which passes under the nozzle. In this example, a second nozzle in a different row of nozzles will deposit the food product into the mould cavity into which the first nozzle did not deposit the food product.

Any number of rows of nozzles could be provided. For example, three rows of nozzles could be provided with each nozzle configured to deposit the food product into every third mould cavity, which passes under the nozzle.

Such an arrangement allows mould cavities to be placed closer together without reducing the speed each nozzle deposits the food product, thereby increasing the number of mould cavities that can be filled per minute without significantly increasing the size of the apparatus.

In some aspects, the food product may be aerated chocolate. As such, the apparatus allows the aerated chocolate to be evenly deposited across a mould cavity, reducing the amount the aerated chocolate is required to be vibrated. In the case of micro-aerated chocolate, a reduction in vibration is particularly beneficial as this reduces bubble coalescence and expansion.

BRIEF DESCRIPTION OF THE DRAWINGS

Embodiments of the invention will now be described, by way of example only, with reference to the following figures.

In accordance with one (or more) embodiments of the present invention, the Figures show the following:

FIG. 2C illustrates the depositing apparatus at a third stage of use.

FIG. 2D illustrates the depositing apparatus at a fourth stage of use.

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including, but not limited to".

The invention is further described with reference to the following examples. It will be appreciated that the invention as claimed is not intended to be limited in any way by these examples. It will be further recognised that the skilled reader will understand from the teaching herein that integers and features of different embodiments may be used in any suitable and advantageous combination.

DETAILED DESCRIPTION OF THE DRAWINGS

Figure 1:
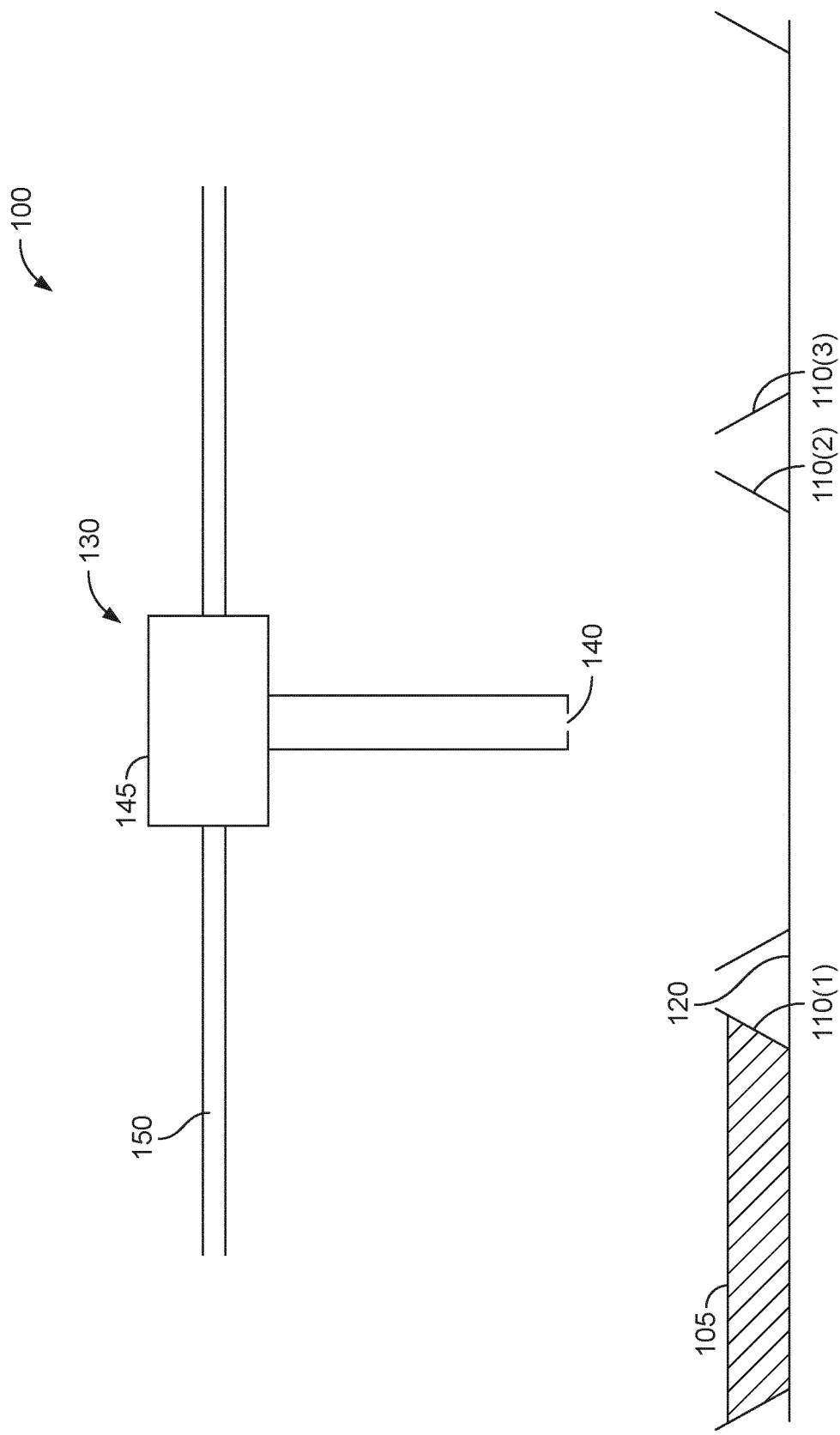
FIG. 1 illustrates a traditional apparatus for depositing a food product into a mould cavity.

FIG. 1 shows a traditional apparatus for depositing a food product 105 into mould cavities 110. The apparatus includes a nozzle 130 for depositing the food product 105. The nozzle 130 includes a chamber 135 for holding the food product 105 and an orifice 140, which can be opened and closed, provided at an end of the nozzle 130 from which the food product 105 is deposited.

The nozzle 130 further includes a mounting section 145, which mounts the nozzle 130 to a rail 150. The apparatus 100 includes a track 120 for transporting the mould cavities. In use, the track 120 moves the mould cavities 110 along a linear path and the nozzle 130 moves along the rail 150 in a linear path.

The nozzle 130 deposits the food product 105 into a first mould cavity 110(1) by ejecting the food product 105 through the orifice 140 while the nozzle 130 moves along the rail 150 in synchronisation with the first mould cavity 110(1). After the nozzle 130 has finished depositing the food product 105 into the first mould cavity 110(1), the nozzle 150 moves along the rail 150 to position the orifice 140 above the second mould cavity 110(2) which is moved along the track 120.

The nozzle 130 then deposits the food product 105 into the second mould cavity 110(2) by ejecting the food product 105 through the orifice 140 while the nozzle 130 moves along the rail 150 in synchronisation with the second mould cavity 110(2). After the nozzle 130 has finished depositing the food product 105 into the second mould cavity 110(2), a similar process is carried out with respect to a third mould cavity 110(3).

Once the food product 105 has been deposited into a mould cavity 110, the mould cavity 110 is usually vibrated to cause the food product 105 to evenly fill the mould cavity 110 to ensure the resulting product is the desired shape.

The deposition of the food product into a mould cavity 110 can be controlled by increasing the pressure at which the food product 105 is provided, opening the orifice 140 for a longer or shorter duration, or by increasing or decreasing the travel speed of the nozzle 130 relative to the mould cavity 110.

However, such systems can require a significant amount of factory space to implement due to requiring space for component necessary for moving the nozzle 130 linearly, such as the rail 150 and do not provide the ability to manage fluctuations in the pressure/flow of the food product, which can result in inconsistent total product weights.

FIGS. 2A-2D illustrates an example apparatus 200 for depositing a food product 205 into a mould cavity 210(1). A mould transporter 220 is provided which moves a mould cavity 210(1) relative to the nozzle 230. The mould transporter 220 may form part of the apparatus 200 or may be considered separate from the apparatus 200. The mould cavity transporter 220 may, for example, be a conveyor belt or a chain system, however any system which may transport the mould cavity 210(1) under the nozzle 230 may be used.

The apparatus 200 comprises a nozzle 230 including an orifice 240 for depositing the food product 205. The orifice 240 can be opened and closed to control the deposition of the food product. The apparatus 200 may additionally comprise an actuator (not shown) to control the opening and closing of the orifice 240. The orifice 240 can be opened to multiple different open positions to control the rate of flow of the food product 205 from the nozzle, as will be later described in relation to FIGS. 3A-5B. The apparatus 200 may further comprise a controller 260 which may control the opening of the nozzle 230 though the actuator.

Figure 2A:
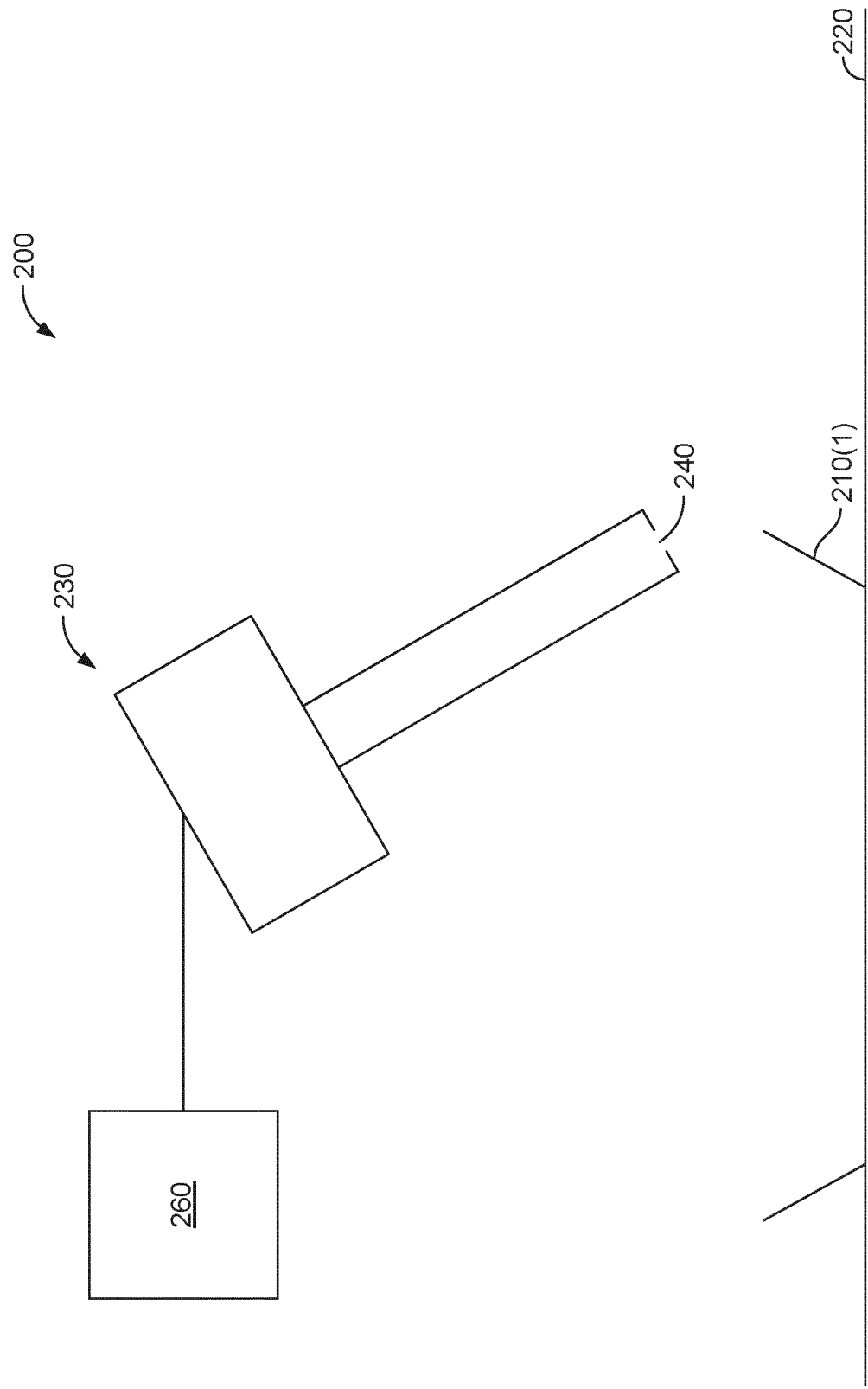
FIG. 2A illustrates a depositing apparatus at a first stage of use.

FIG. 2A illustrates the apparatus 200 in a first stage of use with the orifice 240 of the nozzle 230 in a closed state. As shown, the nozzle 230 is angled with respect to the mould cavity 210(1). Although not shown, in this position the controller is configured to open the orifice 240 of the nozzle 230 to begin deposition of the food product 205.

The angle of the nozzle 230 in the first state causes the food product 205 to be deposited non-vertically. Accordingly, the food product can be directed to a non-central region (or portion) of the mould cavity 210(1). Although the nozzle 230 is shown as directing the food product towards a leading portion of the mould cavity 210(1) (where the mould cavity moves from left to right in FIG. 2A), the nozzle may alternatively direct the food product 205 towards a trailing portion of the mould cavity 210(1).

As the mould transporter 220 moves the mould cavity 210(1) under the nozzle 230, the nozzle 230 rotates to alter the angle of deposition relative to the mould cavity 210(1). Accordingly, the nozzle 230 is able to deposit the food product 205 into the mould cavity 210(1) throughout a particular range of movement of the mould cavity 210(1).

The nozzle 230 may rotate in generally synchronously with the movement of the mould cavity 210. Small adjustments to the timing of the rotation of the nozzle 230 can be made, as well as adjustments to the open position of the orifice 240, allowing the apparatus 200 to compensate for small misalignments between mould cavities 210.

Figure 2B:
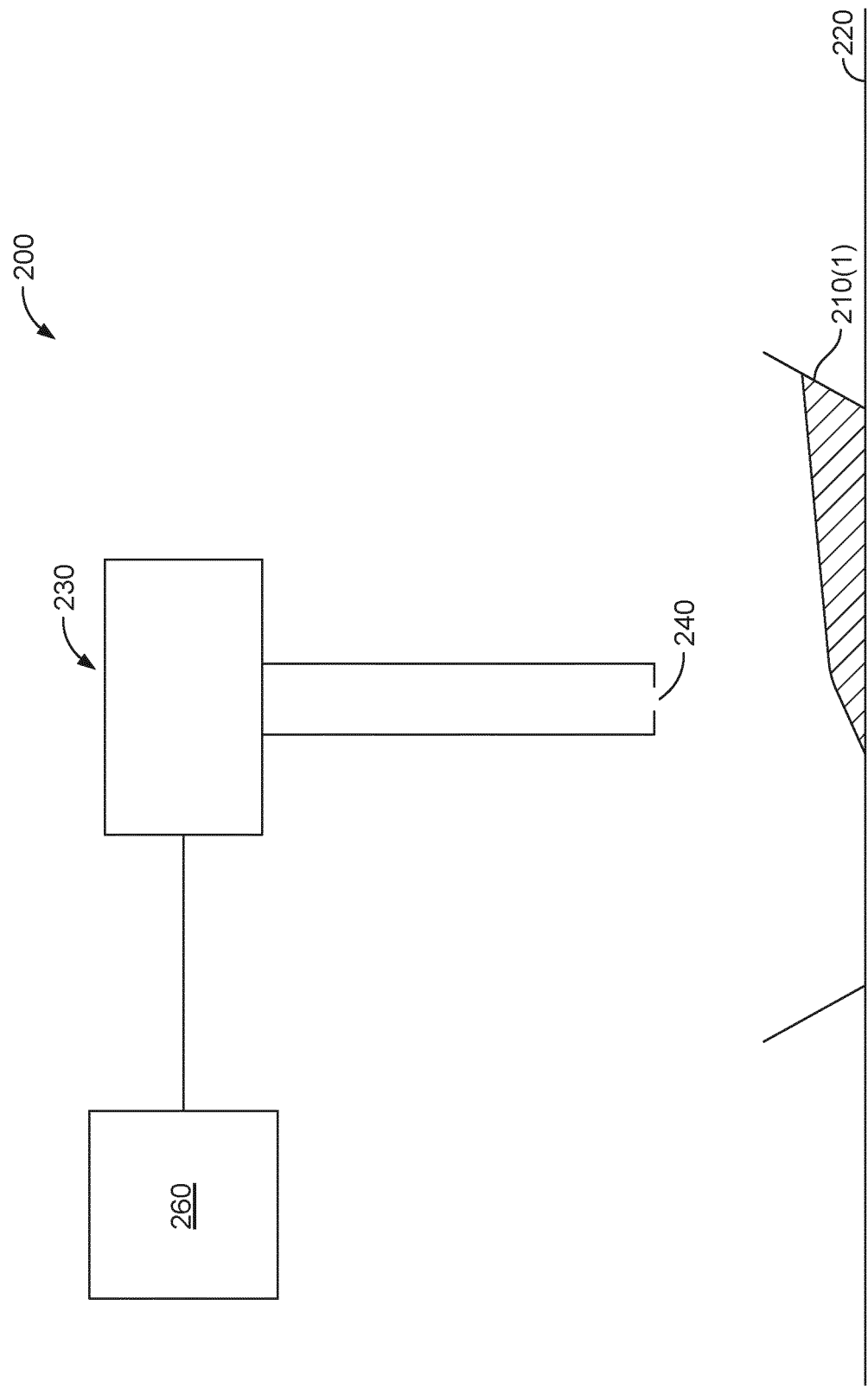
FIG. 2B illustrates the depositing apparatus at a second stage of use.

FIG. 2B illustrates the apparatus 200 in a second stage of use after the first stage of use shown in FIG. 2A. In this second stage of use, the nozzle 230 is at a substantially perpendicular angle to the mould cavity 210(1) after the mould cavity 210(1) has been moved by the mould transporter 220 and the nozzle 230 has been rotated. Accordingly, the food product 205 is deposited approximately vertically, which allows the food product 205 to be directed to a substantially central region of the mould cavity 210(1).

Between the first stage (shown in FIG. 2A) and the second stage (shown in FIG. 2B), the nozzle 230 may continuously deposit the food product 205 by maintaining the orifice 240 in an open state. Alternatively, the orifice 240 may be closed and reopened potentially multiple times between the first state and the second state, such that the food product 205 is not continuously deposited. Moreover, the rate of deposition of the food product 205 can be altered between the first state and the second state (potentially multiple times) by adjusting the open position of the orifice 240.

Furthermore, a lateral position of the nozzle 230 may remain substantially unchanged between the first state and the second state. In other words, the nozzle 230 is not translated between the first state and the second state.

FIG. 2C illustrates the apparatus 200 in a third stage of use after the second stage of use shown in FIG. 2B. In this third stage, the mould cavity 210(1) has been further moved under the nozzle 230 by the mould cavity transporter 220. Accordingly, nozzle 230 has been further rotated to alter the angle of the nozzle 230 with respect to the mould cavity 210(1) to allow the food product 205 to be deposited into the mould cavity 210(1) between the second and third stages.

The angle of the nozzle 230 in the third state causes the food product 205 to be deposited non-vertically. Accordingly, the food product 205 can be directed to a non-central region of the mould cavity 210(1) different to the non-central region of the mould cavity 210(1) to which the food product 205 is directed in the first state. Although the nozzle 230 is shown as directing the food product 205 towards a trailing portion of the mould cavity 210(1) (where the mould cavity moves from left to right in FIG. 2C), the nozzle 230 may alternatively direct the food product 205 towards a leading portion of the mould cavity. Alternatively, the mould cavities can be made stationary underneath the depositor.

Similarly to as described in relation to FIG. 2B, between the second stage (shown in FIG. 2B) and the third stage (shown in FIG. 2C), the nozzle 230 may continuously deposit the food product 205 by maintaining the orifice 240 in an open state. Alternatively, the orifice 240 may be closed and reopened potentially multiple times between the second state and the third state, such that the food product 205 is not continuously deposited. Moreover, the rate of deposition of the food product 205 can be altered between the second state and the third state by adjusting the open position of the orifice 240.

Furthermore, a lateral position of the nozzle 230 may remain substantially unchanged between the second state and the third state. In other words, the nozzle 230 is not translated between the second state and the third state.

Once the desired quantity of the food product 205 has been deposited into the mould cavity 210(1) and the desired coverage of the food product 205 across the mould cavity 210(1) is achieved, the orifice 240 is moved to a closed state to end the deposition of the food product 205 into the mould cavity 210(1).

By allowing the food product 205 to be deposited evenly throughout the mould cavity 210(1), the amount of vibration that is required to achieve a smooth covering of the food product 205 is reduced. This is particularly advantageous in examples where the food product 205 is aerated chocolate, as excessive vibration can cause reduced bubble coalescence and expansion, which may be undesirable (particularly in micro-aerated chocolate). In the case of macro-aerated chocolate, the smooth and precise distribution is also advantageous, as any secondary layer subsequently applied to the food product remains flat and evenly distributed. Overall, this enhances the final weight control and production efficiency.

After the orifice 240 is moved to a closed state, the nozzle 230 may be required to begin depositing the food product 205 into a second mould cavity 210(2), moved by the mould transporter 220, within a short space of time to ensure that the desired quantity of the food product 205 can be deposited into the second mould cavity 210(2) with the desired coverage before the mould transporter 220 moves the second mould cavity 210(2) outside the range of the nozzle 230.

Accordingly, the nozzle 230 performs a return motion to rapidly move the nozzle 230 from the angular position shown in FIG. 2C to the angular position shown in FIG. 2D, which is the same angular position shown in FIG. 2A. Accordingly, as shown in FIG. 2D, the nozzle 230 can begin depositing the food product 205 into a leading portion of the second mould cavity 210(2) shortly after finishing depositing the food product 205 into the first mould cavity 210(1).

As an example, the end of the nozzle at which the orifice 240 is provided may move at approximately between 1-800 mm/s during the return motion. The rapid return motion prevents 'tailing' of the food product 205 between the mould cavities 210(1) and 210(2). That is, the return motion causes any residual food product 205, remaining around the orifice 240 after the orifice 240 has been closed, to be deposited into the first mould cavity 210(1) before deposition into the second mould cavity 210(2) is begun. Accordingly, wastage of the food product 205 can be reduced, as well as enhancing cleanliness, which additionally increases production efficiency over time. The return motion may be executed in an opposite rotational direction to the rotational motions shown across FIGS. 2A-2C, or the return motion may be executed in the same rotational direction.

Throughout the rotational motion of the nozzle 230, the nozzle may remain in substantially the same lateral position. That is, the nozzle 230 may rotate about a particular axis without being translated. Accordingly, linear movement of the nozzle 230 can be decreased, thereby lowering mechanical stress in the apparatus, reducing component failures and wear. The nozzle 230, however, may be moved laterally in addition to the rotational motion.

Figure 3A:
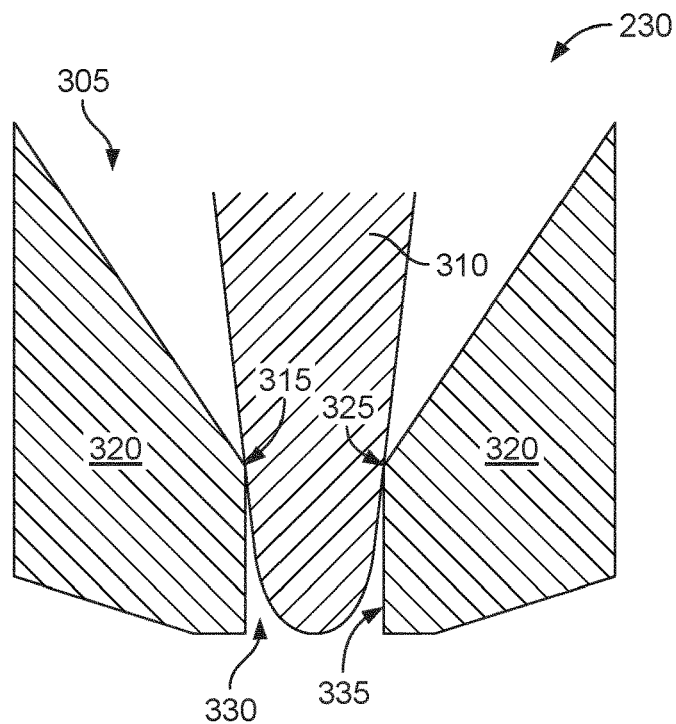
FIGS. 3A and 3B illustrate different views of a nozzle in a closed state.

FIG. 3A illustrates a cross-sectional view of nozzle 230, where the nozzle 230 is configured to deposit the food product in a downwards direction as shown. The nozzle 230 includes a chamber 305 defined by chamber walls 320. The chamber 305 also includes an outlet 330 from which the food product is deposited. The outlet 330 is provided with a first sealing surface 315. In some examples, the first sealing surface may be an edge between the outlet 330 and the walls of the chamber 305.

The nozzle 230 further includes a valve needle 310. The valve needle 310 is movable in a vertical direction relative to the outlet 330 (and the chamber walls 320), and is provided with a second sealing surface 315. In some examples, the second sealing surface may be an edge. The valve needle 310 may be movable by an actuator (not shown).

In FIG. 3A, the first sealing surface 315 and the second sealing surface 325 are proximate to one another (the sealing surfaces 315 and 325 are shown as abutting one another, however this is not necessarily required, depending upon the viscosity of the food product). Accordingly, the nozzle 230 is in a closed state, where the food product cannot flow from the chamber 305 to the outlet 330. The chamber 305 can receive the food product under a positive pressure (e.g. a pressure exceeding atmospheric pressure), greater than 1.0 bar, greater than 1.1 bar, greater than 1.25 bar, greater than 1.5 bar or greater than 2.0 bar, for example, 1.0 bar to 20.0 bar, 1.0-15.0 bar, 1.5-12.5 bar, 2.0-10.0 bar or 3.0-7.0 bar, such that the proximity of the first and second sealing surfaces 315 and 325 prevents the flow of the food product to the outlet 330.

As shown, the outlet 330 may have a substantially cylindrical shape and the valve needle 310 may have a substantially conical shape. Accordingly, the sides of the valve needle 310 may be angled with respect to the inner surface 335 of the outlet 330. Alternatively, the outlet 330 and valve needle 310 may have other complimentary shapes which allow the nozzle 230 to be placed in a closed state. For example, the valve needle may have an approximately four-sided pyramid shape, and the outlet may have an approximately square prism shape.

Figure 3B:
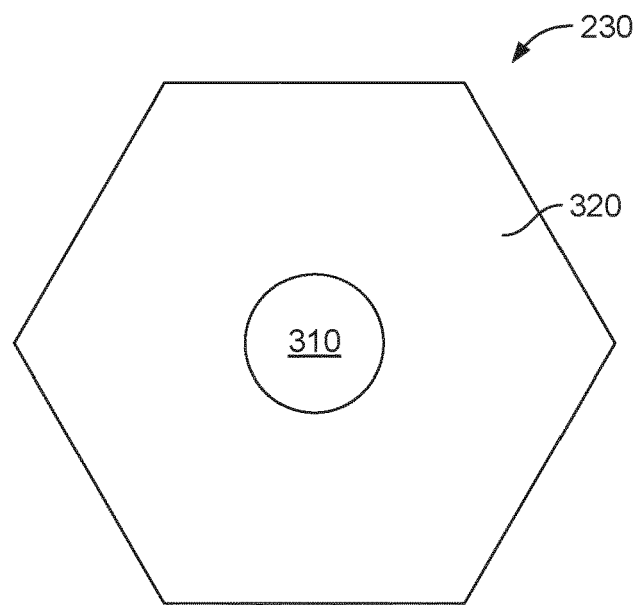

FIG. 3B illustrates an alternative view of the nozzle 230 shown in FIG. 3A, shown from an underside of the nozzle 230, taken at the second sealing surface 325. As shown, there is no gap though which the food product may flow between the valve needle 310 and the chamber walls 320. As such, the nozzle 230 is in a closed state.

Figure 4A:
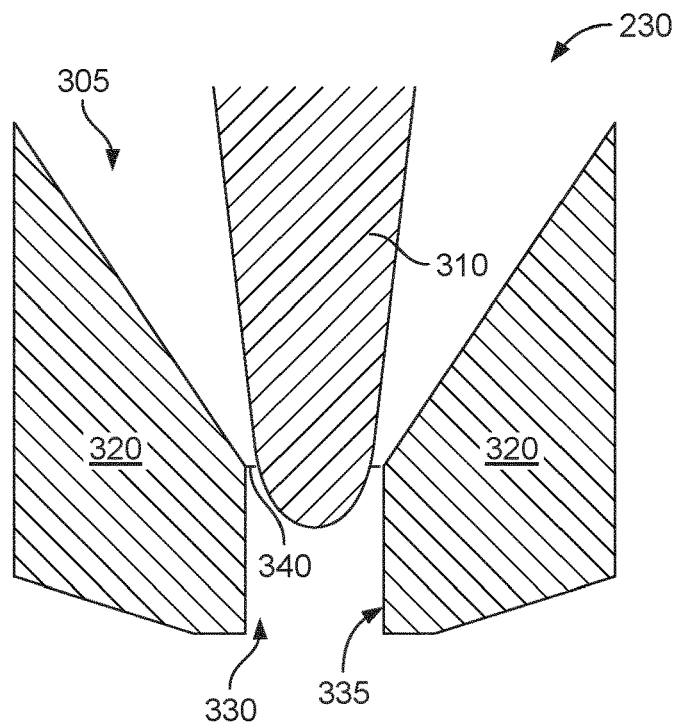
FIGS. 4A and 4B illustrate different views of a nozzle in a first open state.

FIG. 4A illustrates the nozzle 230 from the same viewpoint as FIG. 3A, in a first open state. As shown, the valve needle 310 has been moved vertically upwards relative to the orifice 330 and chamber walls 320. Accordingly, the first sealing surface 315 of the valve needle 310 is not proximate the second sealing surface 325 of the outlet 330. As such, an orifice 340, shown by the dashed line, is created through which the food product can flow from the chamber 305 to the outlet 330.

Figure 4B:
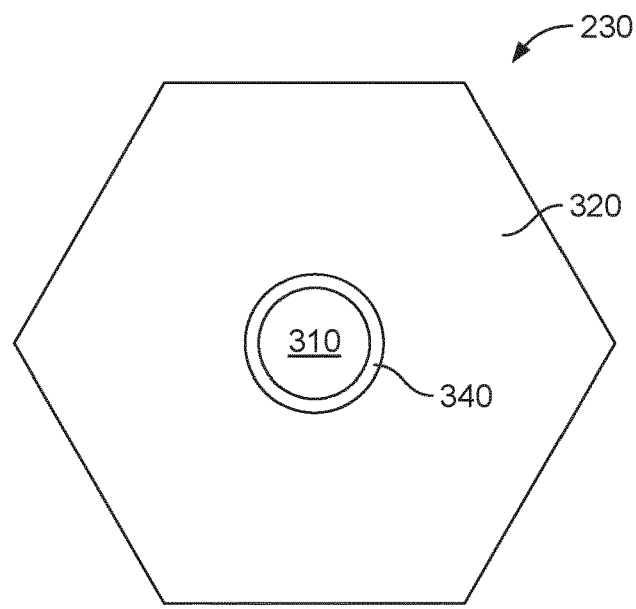

As shown in FIG. 4B, which shows the same viewpoint of the nozzle 230 as FIG. 3B, the orifice 340 has an annular shape. The food product is able to flow through this orifice 340 such that the food product can be deposited.

Figure 5A:
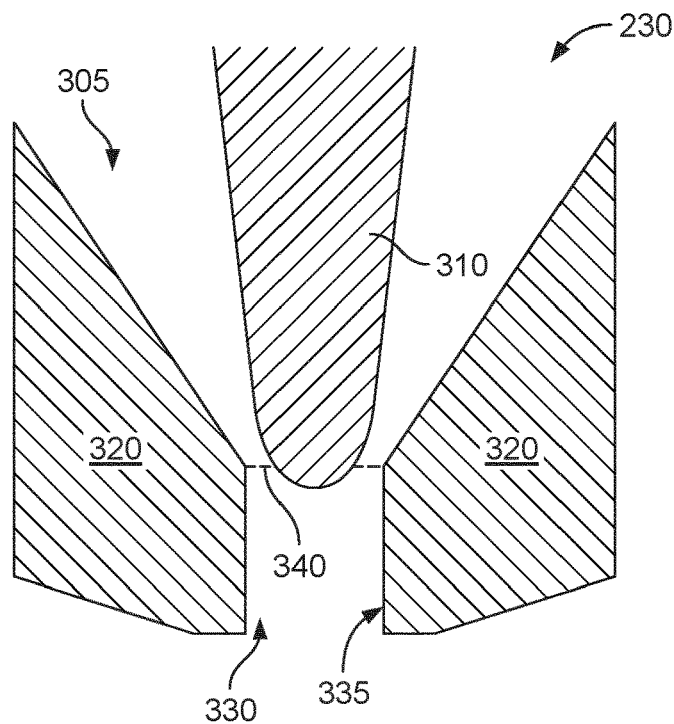
FIGS. 5A and 5B illustrate different views of a nozzle in a second open state.

FIG. 5A illustrates the nozzle 230, from the same viewpoint as FIGS. 3A and 4A, in a second open state. As shown, the valve needle 310 has been further moved vertically upwards as compared to the first open state shown in FIG. 4A. Accordingly, the cross-sectional area (or size) of the orifice 340, shown by the dashed line, has increased as compared to the first open state.

Figure 5B:
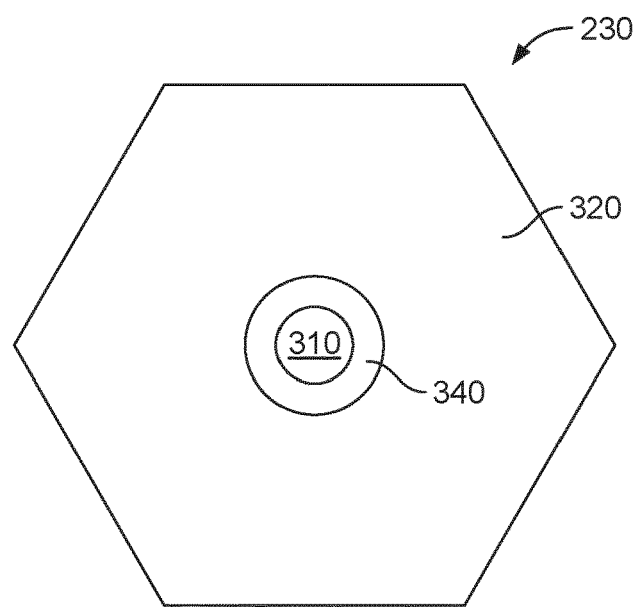

As shown in FIG. 5B, which shows the same viewpoint of the nozzle 230 as FIGS. 3B and 4B, the size of the annular orifice 340 has increased in size as compared to the first open state shown in FIG. 4B. As such, the food product can flow from the chamber 305 to the outlet 330 at a faster rate in the second open state than in the first open state.

The position of the valve needle 310 may be set to any of multiple different open states (for example the first and second open states shown in FIGS. 4 and 5 respectively) when depositing the food product. That is, the valve needle 310 is not restricted to only moving through particular open positions to arrive at a single open state. Rather, the valve needle 310 can be maintained, as desired, at any given open state, and adjusted, as required during the deposition.

For example, during a deposition process the valve needle 310 may start at a closed state. The valve needle 310 may then move to the second open state for a first time before moving to the first open state for second time. The valve needle may then move back to the second open state for third time, before moving to the closed state.

The valve needle 310 may be adjusted by an actuator in height increments that allow for precise control of the cross-sectional area of the orifice 340, and hence the rate of flow of the food product. For example, the valve needle 310 may be set to particular heights in increments of 0.01 mm, however other increments such as between 0.005 mm and 0.1 mm could instead be used. Accordingly, the cross-sectional area of the orifice can be very precisely adjusted.

Figure 6:
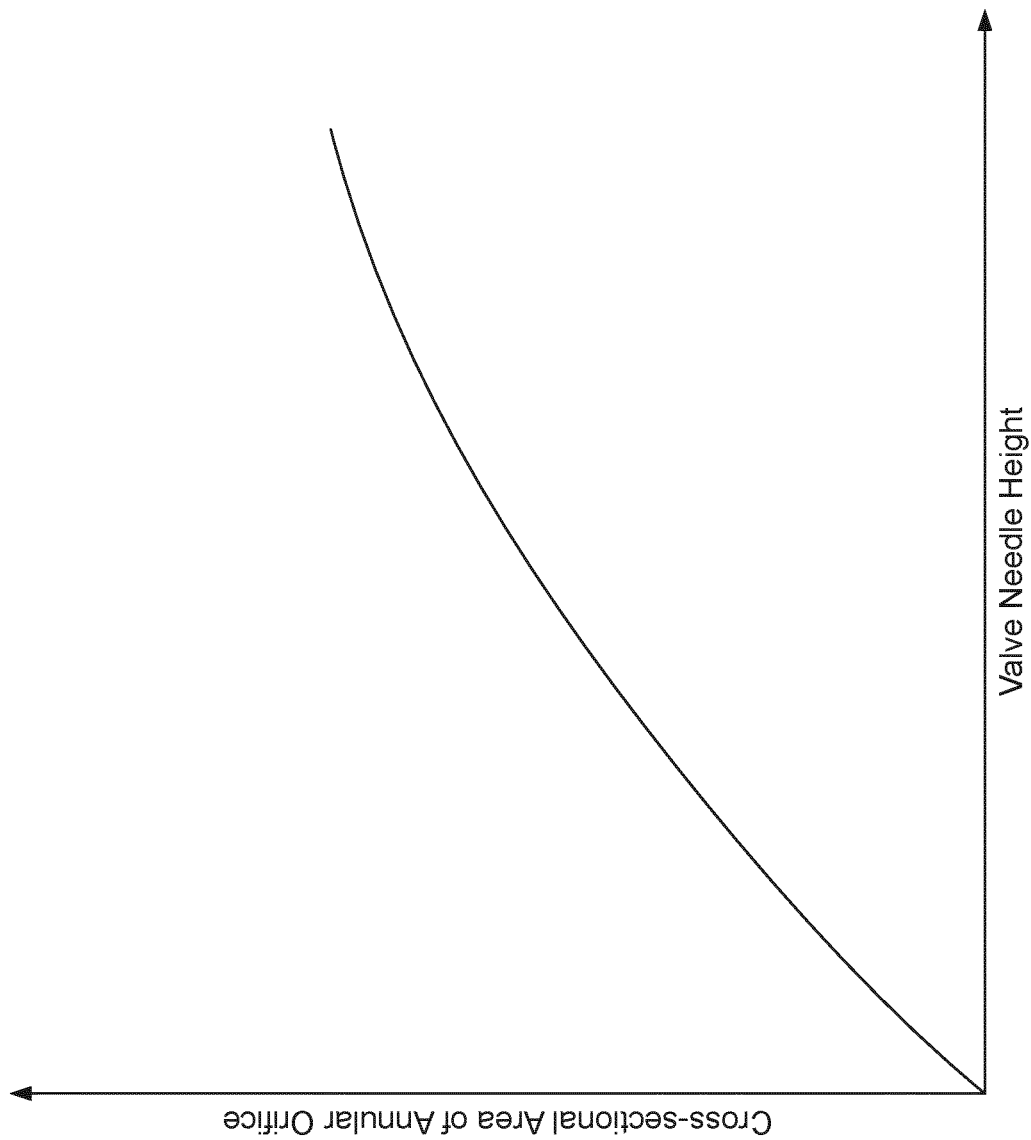
FIG. 6 illustrates a graph of the cross-sectional area of an annular orifice against the height of a valve needle.

FIG. 6 illustrates an example graph showing the cross-sectional area of an orifice against the height of a valve needle for a conical valve needle and cylindrical outlet. The curve shown has a regular shape with a shallow slope. Accordingly, small adjustments to the cross-sectional area can be made by making similarly small adjustments to the valve needle height. As such, the rate of flow of the food product can be finely controlled.

Figure 7:
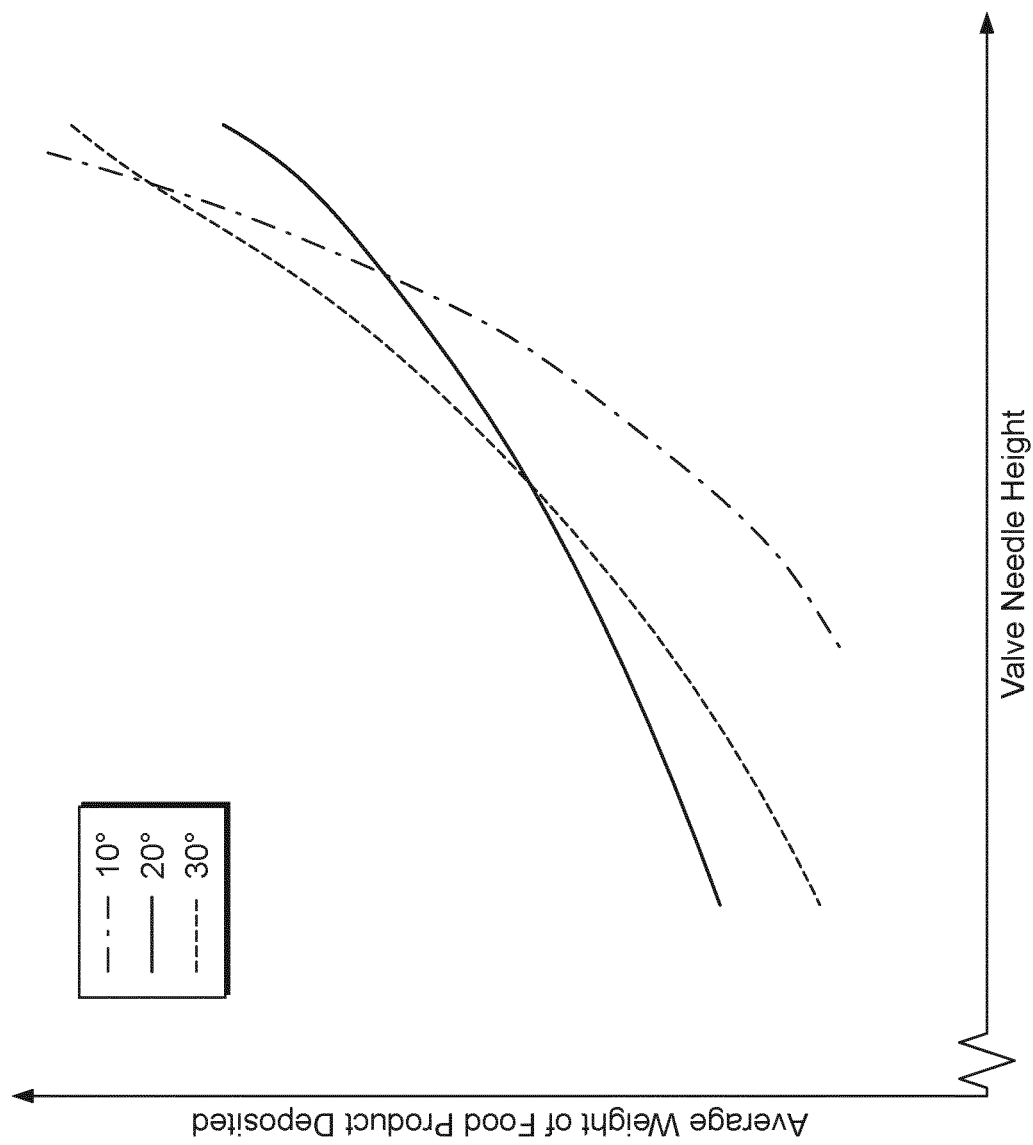
FIG. 7 illustrates a graph of the average weight of a food product deposited by a nozzle in a given time period for a particular valve needle height, for multiple angles between the sides of the valve needle and the walls of an outlet of the nozzle.

Furthermore, the change in cross-sectional area of the orifice, and hence the rate of flow of the food product, for a given change in valve needle height is dependent on the angle between the sides of the valve needle and the walls of the outlet. FIG. 7 illustrates and example graph showing the average weight of a food product deposited by a nozzle in a set time period against the height of the valve needle, for three different angles between the sides of the valve needle and the walls of the outlet.

The graph includes curves for total (i.e. sum of angles on both sides of needle) angles of 10 degrees, 20 degrees and 30 degrees, i.e. angles between the sides of the valve needle and the walls of the outlet of 5, 10 and 15 degrees on each side of the needle. However, other individual angles, such as between 1 and 45 degrees could be used (i.e. total angles of between 2 and 90 degrees). The needle is preferably essentially symmetrical in this embodiment, i.e. a total angle of between 2 and 90 degrees relates to the sum of two angles of the same value between 1 and 45 degrees. While a total angle of 10 degrees or 30 degrees between the sides of the valve needle and the walls of the outlet could be utilised, a total angle of 20 degrees yields a shallower curve on the graph of FIG. 7 than these angles. Accordingly, a total angle of 20 degrees between the sides of the valve needle and the walls of the outlet allows for smaller adjustments to the rate of flow of the food product for a given change in valve needle height, therefore providing more precise control of the quantity of food product deposited.

Figure 8:
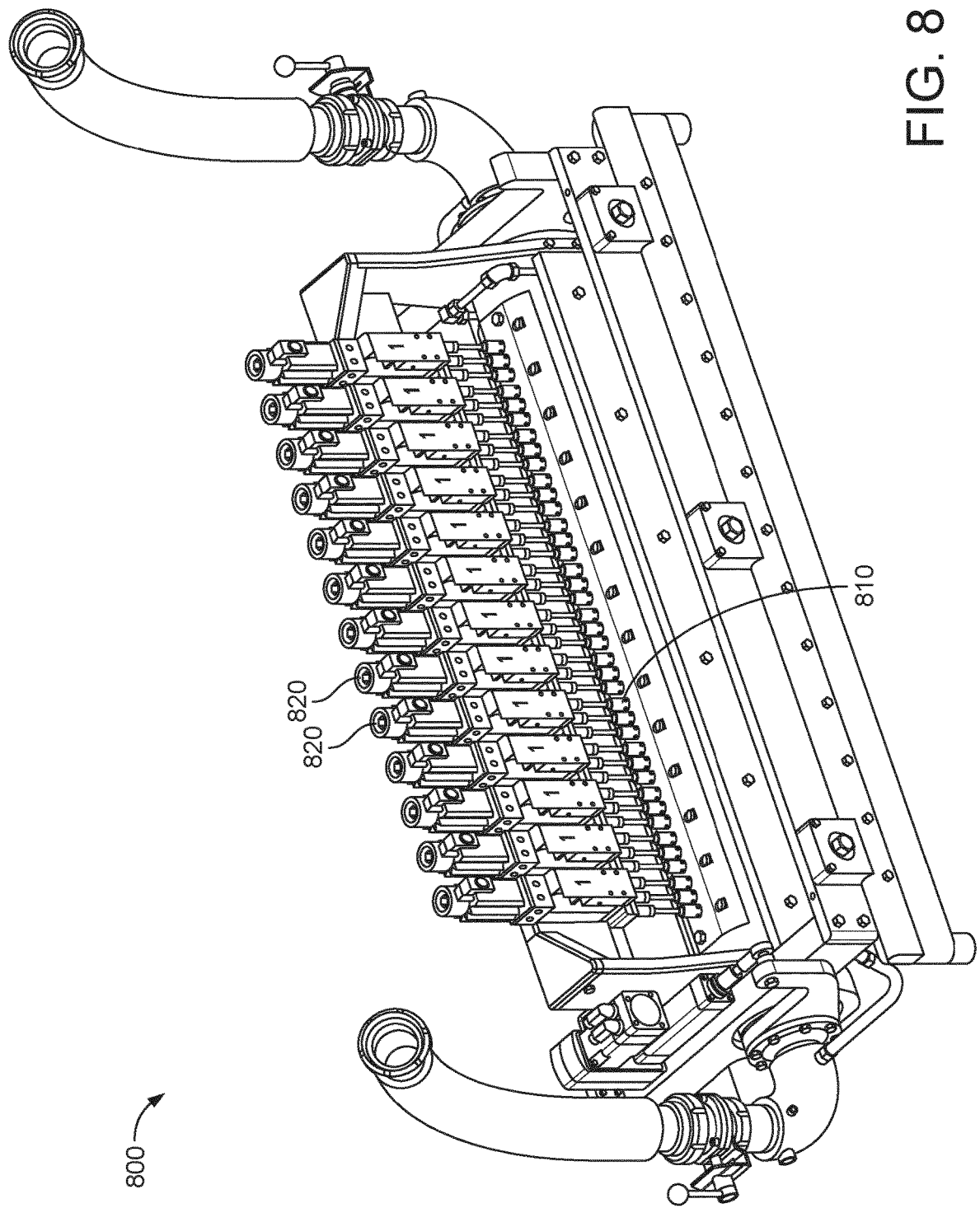
FIG. 8 illustrates a depositing apparatus including multiple nozzles.

FIG. 8 illustrates an example apparatus 800 for depositing a food product. The apparatus 800 includes a plurality of nozzles 810 arranged in a row, such that mould cavities may move in parallel under the nozzles simultaneously. Accordingly, the number of mould cavities that can be filled per minute is greatly increased without a large increase in overall the size of the apparatus.

Furthermore, the nozzles 810 may be arranged in groups 820, where each group 820 deposits the food product into a different mould cavity. Accordingly, large moulds can be filled evenly, reducing the level of vibration required to obtain an even coverage in the mould cavity. Furthermore, the rate of deposition required by each nozzle can be reduced without any loss in the overall food product deposition rate, allowing finer control over the quantity and coverage of the food product within the mould. In the example apparatus 800 shown in FIG. 8, the apparatus 800 includes 13 groups 820 for depositing into up to 13 mould cavities at once.

Each group 820 includes 3 nozzles, where each nozzle 810 in a group 820 deposits the food product into the same mould cavity. The chamber of each nozzle 810 in a group 820 is in fluid communication with the other nozzles 810 in the group 820. However, the nozzles 810 in a group 820 (and in different groups) may be independently controlled. That is, both the opening and closing of the nozzle 810 and the rotation of the nozzle 810 can be adjusted for each nozzle 810 individually. As such, misalignments between mould cavities can be accounted for on an individual basis, allowing each mould cavity to be filled consistently. Similarly, the independence of the control of the nozzles 810 allows for the compensation of any pressure/flow variation along the depositor chamber in order to optimise the process/weight control of the final product.

In the event that a mould is misaligned with respect to the apparatus 800 (i.e. not perpendicular to the direction to travel), such that particular portions of the mould reach the nozzles 810 before other portions of the mould, each nozzle 810 can begin depositing at a different time and rotational position, can deposit the food product at a different rate, and can deposit different total quantities of the food product, based on the extent of the misalignment.

For example, when a mould cavity passes under the apparatus 800 in a misaligned (or skewed) orientation, a first nozzle of a group of nozzles 820 configured to deposit the food product into the misaligned mould cavity may begin depositing of the food product at a first time, at a first rotational position, at a first rate, and may deposit a first quantity of the food product. Then, a second nozzle of the group of nozzles 820 may begin depositing of the food product into the misaligned mould cavity at a second time, at a second rotational position, at a second rate, and may deposit a second quantity of the food product. One or more of the second time, second rotational position, second rate, and second quantity may be different to the first time, first rotational position, first rate, and first quantity respectively. Each further nozzle in the group of nozzles 820 may begin depositing the food product at a different time, different rotational position, different rate, and/or may deposit a different quantity respectively.

Accordingly, even when a mould is substantially misaligned, this can be compensated for through the independent and precise control of the opening of the nozzles, in combination with the rotation of the nozzle, such that moulds can be evenly filled regardless of mould orientation.

Alternatively, groups of nozzles can be controlled collectively, with each group of nozzles controlled independently of other groups of nozzles, to compensate for variations in placement between different moulds passing through the apparatus.

The apparatus 800 can be provided with multiple rows of nozzles 810. This may take the form of multiple depositors arranged in series, or a single depositor may comprise multiple rows of nozzles in series. For example, a plurality of parallel rows of nozzles could be provided in the apparatus 800. In such examples, each nozzle in a row will only deposit the food product into every Nth mould cavity, where N is the number of rows.

For instance, if two rows were provided, a first nozzle in the first row deposits the food product into a given mould cavity, but does not deposit the food product into the next mould cavity which passes under the nozzle. The first nozzle will then deposit the food product into the following mould cavity, which passes under the nozzle. In this example, a second nozzle in the second row of nozzles will deposit the food product into the mould cavity into which the first nozzle did not deposit the food product, and will not deposit the food product into the mould cavities which the first nozzle did deposit the food product.

Any number of rows of nozzles could be provided. For example, three rows of nozzles could be provided with each nozzle configured to deposit the food product into every third mould cavity, which passes under the nozzle.

Such an arrangement allows mould cavities to be placed closer together without reducing the speed each nozzle deposits the food product, thereby increasing the number of mould cavities that can be filled per minute without significantly increasing the size of the apparatus.

Furthermore, while the depositing apparatus has been described in relation to the deposition of a food product into mould cavities, the food product is not required to be deposited into a mould cavity. Rather, the food product may be deposited onto any target, which may be a target surface or product.

As one example, the techniques and apparatus described above can be used for enrobing fillings (or other constituent parts) for confectionery products (for example in a bar shape, although other shapes could be used) in a layer of the food product. Multiple layers of the food product can be applied to the confectionery product if desired, which could be done by different depositors in series or by the same depositor.

The above-described techniques can also be used for depositing drops of the food product onto a conveyor belt (or other surface) to create precisely weighted button-shaped confectionery products or substantially any other shaped confectionery product. Accordingly, the above-described techniques are not solely applicable to the filling of moulds.

Therefore, there has been described an apparatus for depositing a food product comprising a nozzle having a food product outlet; a valve needle movable relative between a closed position and to one of a plurality of discrete open positions; and an actuator configured to set the position of the valve needle relative to the outlet, wherein the nozzle is further able to rotate in use to change the direction of flow of a food product being deposited by the apparatus.

The invention claimed is:

1. An apparatus for depositing a food product, the apparatus comprising:
    a nozzle having a chamber for receiving a food product under a positive pressure, the chamber being provided with a food product outlet, the outlet being provided with a first sealing surface;
    a valve needle comprising a second sealing surface and being movable relative to the outlet between a closed position in which the first sealing surface is proximate to the second sealing surface, and to one of a plurality of discrete open positions relative to the outlet;
    an actuator configured to set the position of the valve needle relative to the outlet, the actuator operable to set the position of the valve needle to the closed position and any one of the plurality of open positions for depositing the food product; and
    wherein the nozzle is further configured to rotate in use to change the direction of flow of a food product being deposited by the apparatus.

2. The apparatus according claim 1, further comprising a mould cavity transporter configured in use to move one or more mould cavities relative to the rotating nozzle for depositing the food product into the one or more mould cavities.

3. The apparatus according to claim 1, further comprising a controller, the controller configured to:
    control the actuator to set the position of the valve needle; and
    control the rotation of the nozzle in use.

4. The apparatus according to claim 3, wherein the controller is configured to control the actuator to set the position of the valve needle to at least two different open positions during deposition of the food product.

5. The apparatus according to claim 3, wherein the controller is configured to cause the actuator to alter the position of the valve needle to an open position at a first angular position of the nozzle to begin deposition of the food product, and wherein the controller is configured to cause the actuator to alter the position of the valve needle to the closed position at a second angular position different from the first angular position.

6. The apparatus according to claim 5, wherein the controller is configured to cause the nozzle to rotate from the second angular position to the first angular position after the valve needle has closed.

7. The apparatus according to claim 6, wherein an angular velocity of the nozzle during the rotation from the second angular position to the first angular position is larger in magnitude than an angular velocity of the nozzle during deposition of the food product.

8. The apparatus according to claim 3, wherein the controller is configured to cause the actuator to control the position of the valve needle within the nozzle and to simultaneously control the angular position of the nozzle to cause the nozzle to deposit food product over multiple portions of one or more mould cavities.

9. The apparatus according to claim 1, wherein the rotation of the nozzle is synchronised in use with the movement of one or more mould cavities.

10. The apparatus according to claim 1, wherein the valve needle has a substantially conical shape and the outlet has a substantially cylindrical shape, and wherein in an open position the valve needle defines an annular orifice between the outer surface of the valve needle and the inner surface of the substantially cylindrical outlet, and wherein the position of the valve needle determines the size of the annular orifice.

11. The apparatus according to claim 10, wherein the sides of the valve needle are angled with respect to walls of the substantially cylindrical outlet, wherein the angle between the sides of the valve needle and the walls of the substantially cylindrical outlet is between 1 and 45 degrees.

12. The apparatus according to claim 1, wherein the apparatus comprises a plurality of nozzles, wherein the valve needle position and the rotational position of each nozzle is independently controllable.

13. The apparatus according to claim 12, wherein the plurality of nozzles are arranged in a plurality of groups of nozzles, each group of nozzles comprising one or more nozzles, and each group of nozzles configured to deposit the food product into a separate mould cavity.

14. The apparatus according to claim 12, further comprising a plurality of rows of nozzles, wherein the actuator is configured to cause each row of nozzles to alternatively deposit the food product into different mould cavities.

15. The apparatus according to claim 1, wherein the food product is aerated chocolate.

* * * * *